United States Patent
Vlies (10) Patent No.: US 8,100,372 B2
(45) Date of Patent: Jan. 24, 2012

(54) DISPLAY MOUNT FOR CORNER INSTALLATIONS

(76) Inventor: Michael Vlies, Lake Forest, IL (US)

( * ) Notice: Subject to any disclaimer, the term of this patent is extended or adjusted under 35 U.S.C. 154(b) by 43 days.

(21) Appl. No.: 12/587,754

(22) Filed: Oct. 13, 2009

(65) Prior Publication Data

US 2010/0123061 A1    May 20, 2010

Related U.S. Application Data

(60) Provisional application No. 61/195,832, filed on Oct. 10, 2008.

(51) Int. Cl.
A47B 96/06 (2006.01)
(52) U.S. Cl. .................. 248/220.1; 248/278.1; 248/921
(58) Field of Classification Search ............. 248/220.1, 248/274.1, 278.1, 282.1, 231.91, 921, 922, 248/923, 300
See application file for complete search history.

(56) References Cited

U.S. PATENT DOCUMENTS

| | | | | |
|---|---|---|---|---|
| 1,380,518 A | * | 6/1921 | Bellig | 403/219 |
| 5,297,487 A | * | 3/1994 | Simmons | 101/127 |
| 5,349,134 A | * | 9/1994 | Russell | 174/492 |
| 6,364,261 B1 | * | 4/2002 | Vass, Jr. | 248/220.1 |
| 6,431,386 B1 | * | 8/2002 | Hofman et al. | 220/481 |
| 2008/0006751 A1 | * | 1/2008 | Chen et al. | 248/278.1 |
| 2009/0189036 A1 | * | 7/2009 | Foster | 248/220.1 |
| 2009/0308990 A1 | * | 12/2009 | Yen et al. | 248/121 |

* cited by examiner

*Primary Examiner* — Ramon Ramirez
(74) *Attorney, Agent, or Firm* — McDermott Will & Emery LLP (57) ABSTRACT

The invention provides a corner mount apparatus for a flat screen display that is installable on either the left-wall or right-wall of a corner. The corner mount system includes a wall bracket having a first side edge and a second side edge. A first angled surface extends at an angle from the first side edge, and it includes at least one opening. The wall bracket also has a securing region with at least one hole. The corner mount system may further include an interface member. The interface member has a tapered opening defined by opposed flanges. The interface member has an aperture that is aligned with the opening of the first angled surface of the wall bracket. A fastener is received by the aperture and the opening to couple the interface member to the wall bracket. The corner mount system also includes a support arm assembly for supporting the flat screen display. The support arm assembly includes a connector, a first arm and a flat screen display bracket. The connector is slidably received by the tapered opening of the interface member to couple the support arm assembly to the interface member and wall bracket.

20 Claims, 9 Drawing Sheets

DISPLAY MOUNT FOR CORNER INSTALLATIONS

CROSS-REFERENCE TO RELATED APPLICATIONS

This application claims priority from U.S. Provisional Application No. 61/195,832, filed Oct. 10, 2008, which application is incorporated herein by reference and made a part hereto.

FEDERALLY SPONSORED RESEARCH OR DEVELOPMENT

Not applicable.

TECHNICAL FIELD

The invention relates to a corner mount system for installing a flat screen monitor or display to a corner region. The corner mount system includes a wall bracket which permits installation on either wall of the corner region, deep within a corner, without the need for securement to multiple studs.

BACKGROUND OF THE INVENTION

Flat panel displays and monitors, such as plasma and LCD televisions, are an increasingly popular substitute for projection televisions and "tube" televisions. A mount apparatus can be used to secure the flat panel display to an elevated position on a wall. The clarity and resolution of flat panel displays, especially LCD televisions, are best from a position directly in front of the display. As a result, most consumers use existing mounts to secure the flat panel display in the middle of the wall. For example, the existing mount includes a large plate that is secured to the wall in front of a couch to minimize any offset viewing angle. This mounting convention can be found in a number of retail and commercial usages, for example bars, where multiple flat panel displays are mounted across the wall opposite the bar to allow for patron viewing. The display image is often too dark or not visible at all if viewed from a significant angle. Thus, it is quite uncommon to find a flat panel display mounted to a corner of the wall.

Conventional mounts necessitate installation to an intermediate portion of the support wall, i.e. a distance from the corners, because conventional mount designs include large components, such as plate(s), that create clearance issues and preclude installation within the close confines of a corner. However, before a flat screen display is mounted to the wall, at least one stud, and typically a plurality of studs, must be located. Because flat screen displays tend to be heavy, they must be mounted to a stud behind the wall for proper support. Any conventional mounts that are adaptable for corner installation suffer from a number of limitations, including bulky, complicated or poorly functioning adaptor kits and/or hardware that dramatically limit the functionality and effectiveness of the mount, and which preclude installation deep within a corner region.

The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention is directed to a corner mount system that is suitable for installing a flat screen display deep within a corner region in either a left-wall or right-wall installation. The corner mount system includes a wall bracket having a first side edge and a second side edge. A first angled surface extends at an angle from the first side edge, and it includes at least one opening. The wall bracket also has a securing region with at least one hole.

The corner mount system further includes an interface member. The interface member has a tapered opening defined by opposed flanges. The interface member has an aperture that is aligned with the opening of the first angled surface of the wall bracket. A fastener is received by the aperture and the opening to couple the interface member to the wall bracket.

The corner mount system also includes a support arm assembly for supporting the flat screen display. The support arm assembly includes a connector, a first arm and a flat screen display bracket. The connector is slidably received by the tapered opening of the interface member to couple the support arm assembly to the interface member and wall bracket.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
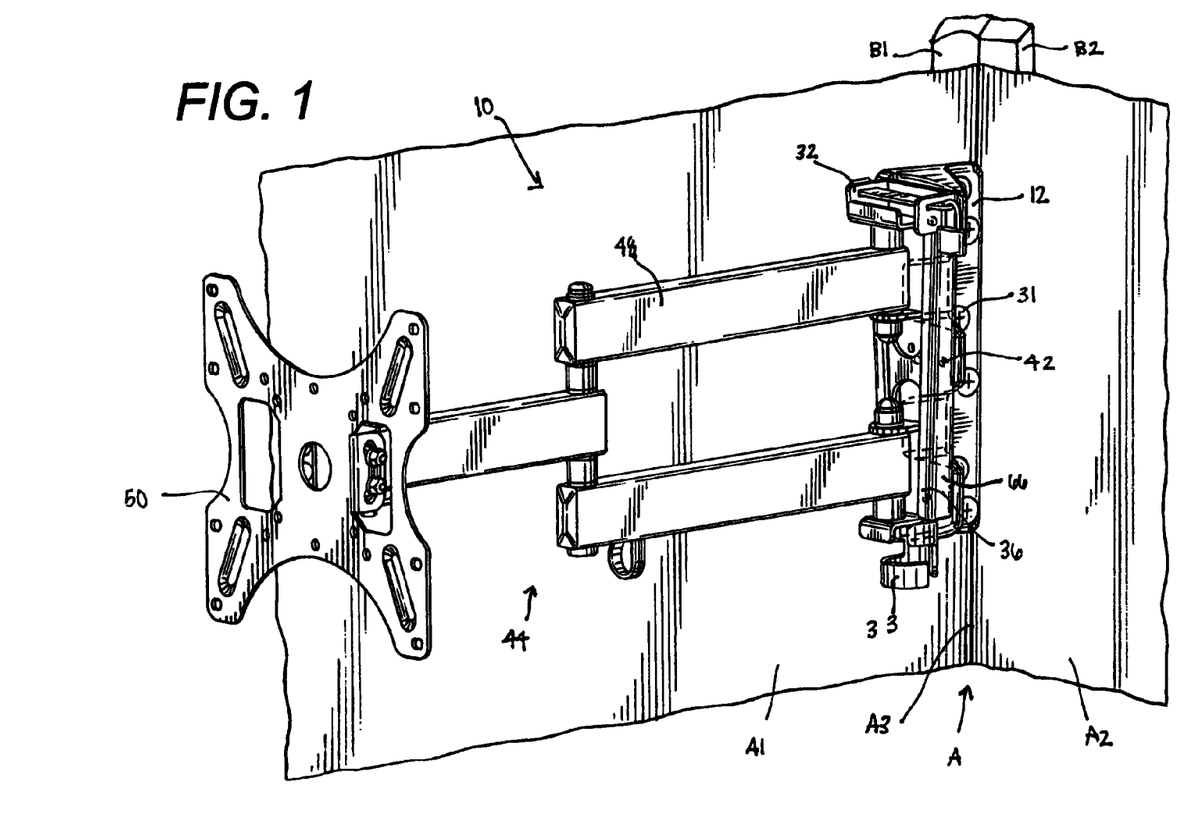
FIG. 1 is a perspective view of a corner mount system having a wall bracket, an interface member and a pivotal support arm assembly in a left installation.

FIG. 1 shows a corner mount system 10 that is suitable for installing a flat screen display (not shown) within a corner region A in either a left-wall or right-wall installation position. Unlike conventional mounts, the corner mount system 10 can be installed deep within the corner region A, on either the left wall A1 or the right wall A2. As such, the corner mount system 10 can be installed proximate a corner seam A3, located at the intersection of the left and right walls A1, A2, to minimize the unnecessary consumption of wall space. These attributes increase the versatility of the corner mount system 10, especially compared to conventional mounts which include structures and/or components that preclude an adequate corner installation due to their significant bulk and dimensions. The limitations of conventional mounts are exacerbated when a flat screen monitor is joined to the mount, thereby making the mount and monitor combination even bulkier, and precluding a corner installation.

Further, mounting the corner mount system 10 proximate the corner seam A3 ensures that the corner mount system 10 will be mounted to a stud. As shown in FIG. 1, studs B1 and B2 are located behind the left and right walls A1, A2, respectively. Generally, structures such as houses or commercial buildings are built such that their corner regions are formed by at least two studs. Therefore, installing the corner mount system 10 in a corner region A proximate the corner seam A3 ensures that the corner mount system 10 will be mounted on either the left stud B1 or the right stud B2, which will provide adequate support for the load resulting from a connection of the flat screen display.

The corner mount system 10 generally includes a wall bracket 12 and a support arm assembly 44. In one embodiment, shown in FIG. 1, the corner mount system 10 may also include an interface member 32. The wall bracket 12 includes a first side edge 16, a second side edge 18 and a first angled surface 20. (See FIGS. 5 and 8). The first angled surface 20 includes at least one opening 22, which can also be seen in FIG. 8. The first angled surface 20 extends at an angle α from the first side edge 16, which is measured with respect to a horizontal reference line X, which is substantially parallel to a first end 24 of the wall bracket 12. The first angled surface 20 extends at an acute angle α, between 40 and 60 degrees, preferably at an angle between 45 and 55 degrees, and most preferably at 50 degrees.

Figure 6:
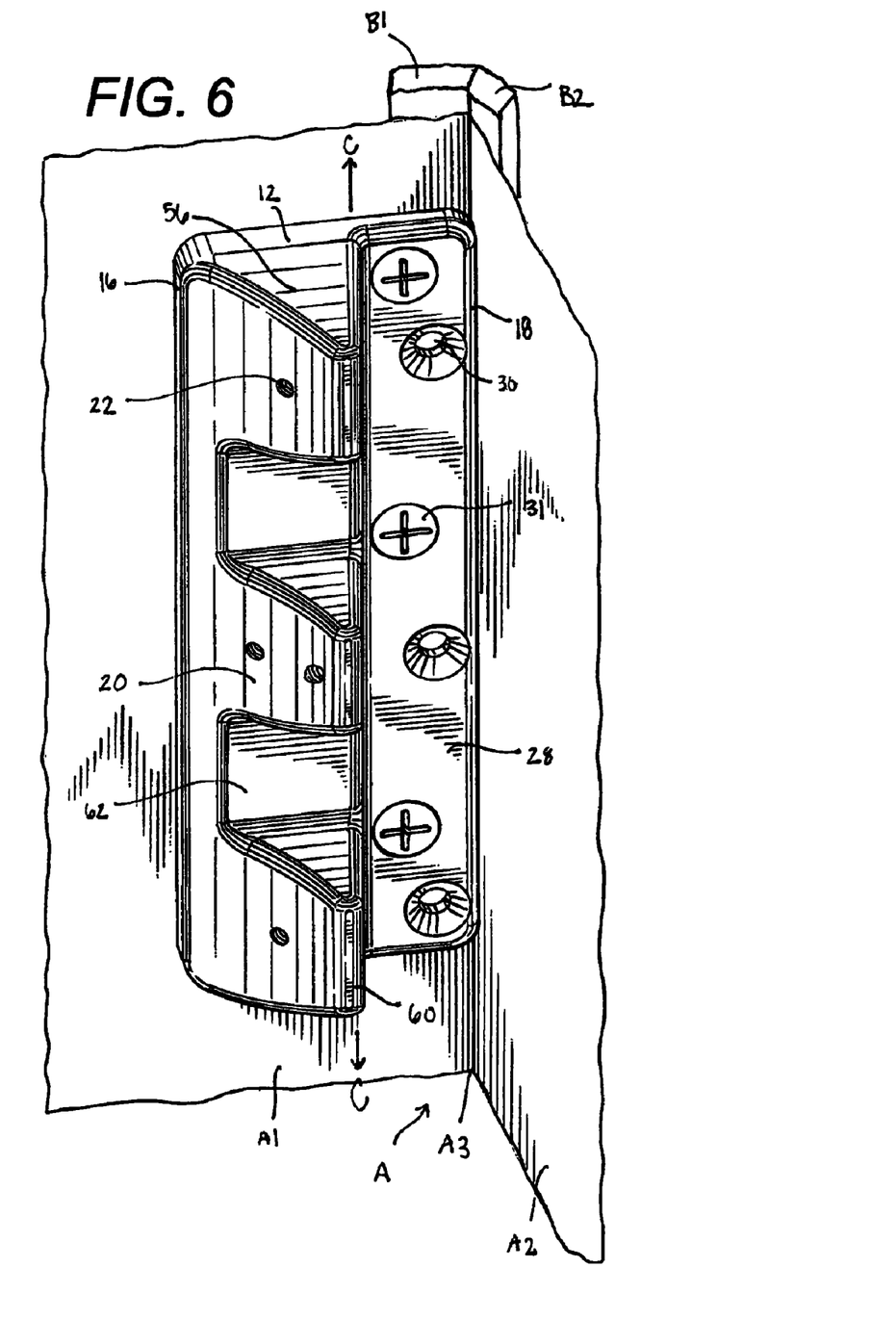
FIG. 6 is a perspective view of the wall bracket of the corner mount system in a left installation.
Figure 9:
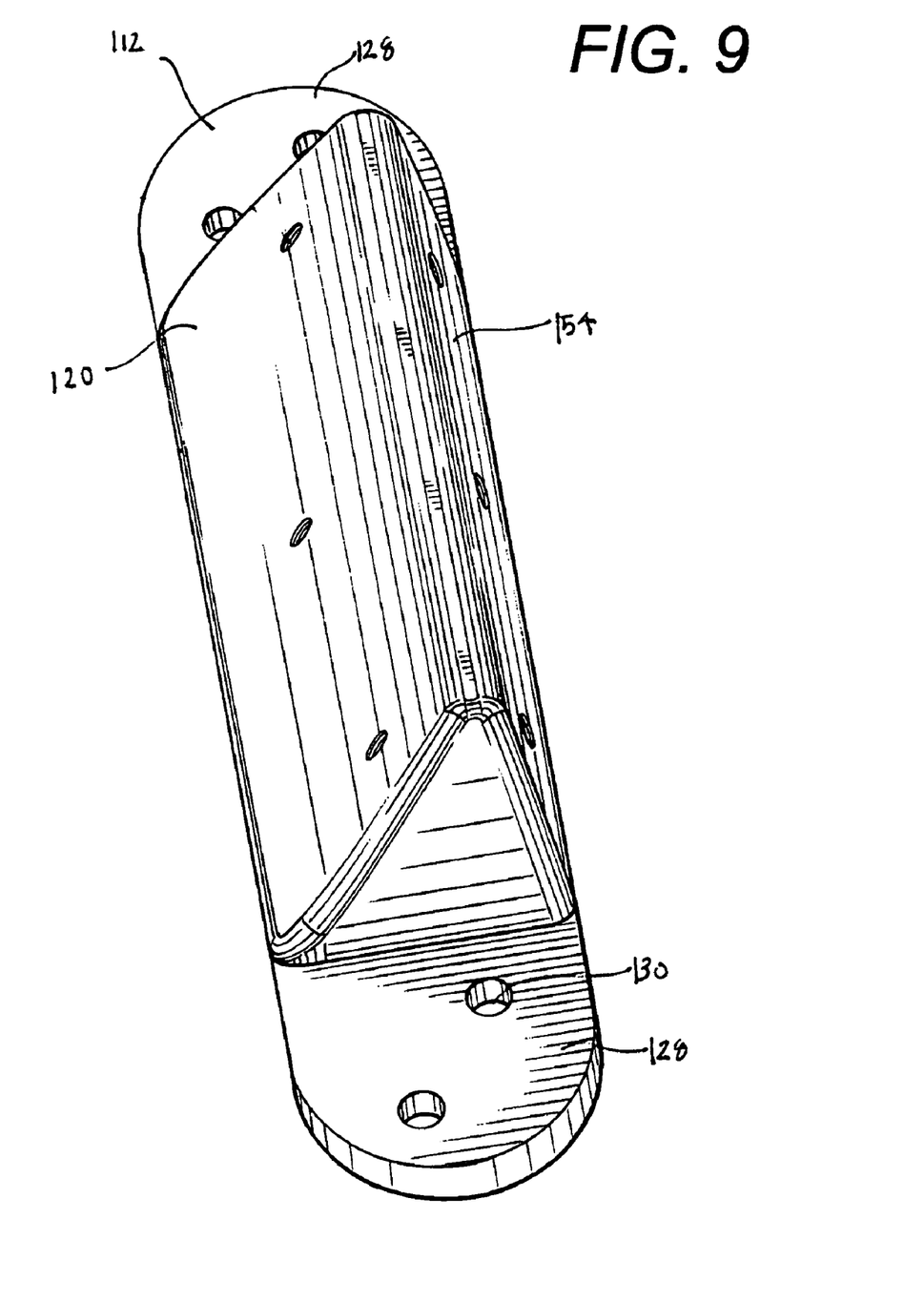
FIG. 9 is a perspective view of an alternate wall bracket of a corner mount system.

The wall bracket 12 further includes a securing region 28 which has at least one hole 30. As shown in FIG. 6, the wall bracket 12 may be mounted to a wall by inserting a fastener 31, such as a flat head screw, into the hole 30, arranged in pairings, of the wall bracket 12. FIG. 6 also shows that the securing region 28 may include a plurality of holes 30 which facilitate installation to the left or right walls A1, A2. In another embodiment, shown in FIG. 9, a wall bracket 112 may multiple securing regions 128, wherein the securing regions 28 are located at opposed ends of the wall bracket 112. In this embodiment, the securing regions 128 may include at least one hole 130 for receiving a fastener 131, or they may include a plurality of holes 130. The wall bracket 112 may also include a first angled surface 120 and a second angled surface 154.

The corner mount system 10 further includes the interface member 32, which is shown in FIG. 1. The interface member 32 includes a tapered opening 34 which is defined by opposed flanges 36, 38. The flanges 36, 38 may be positioned on sidewalls 66, 68 of the interface member 32. The sidewalls 66, 68 may be angled in order to form the tapered opening 34. The interface member 32 includes at least one aperture 40 that can be aligned with the opening 22 of the first angled surface 20. The opening 22 and aperture 40 receives a fastener 42 which couples the interface member 32 to the wall bracket 12. The interface member 32 also includes a cord retention element 33.

Figure 2:
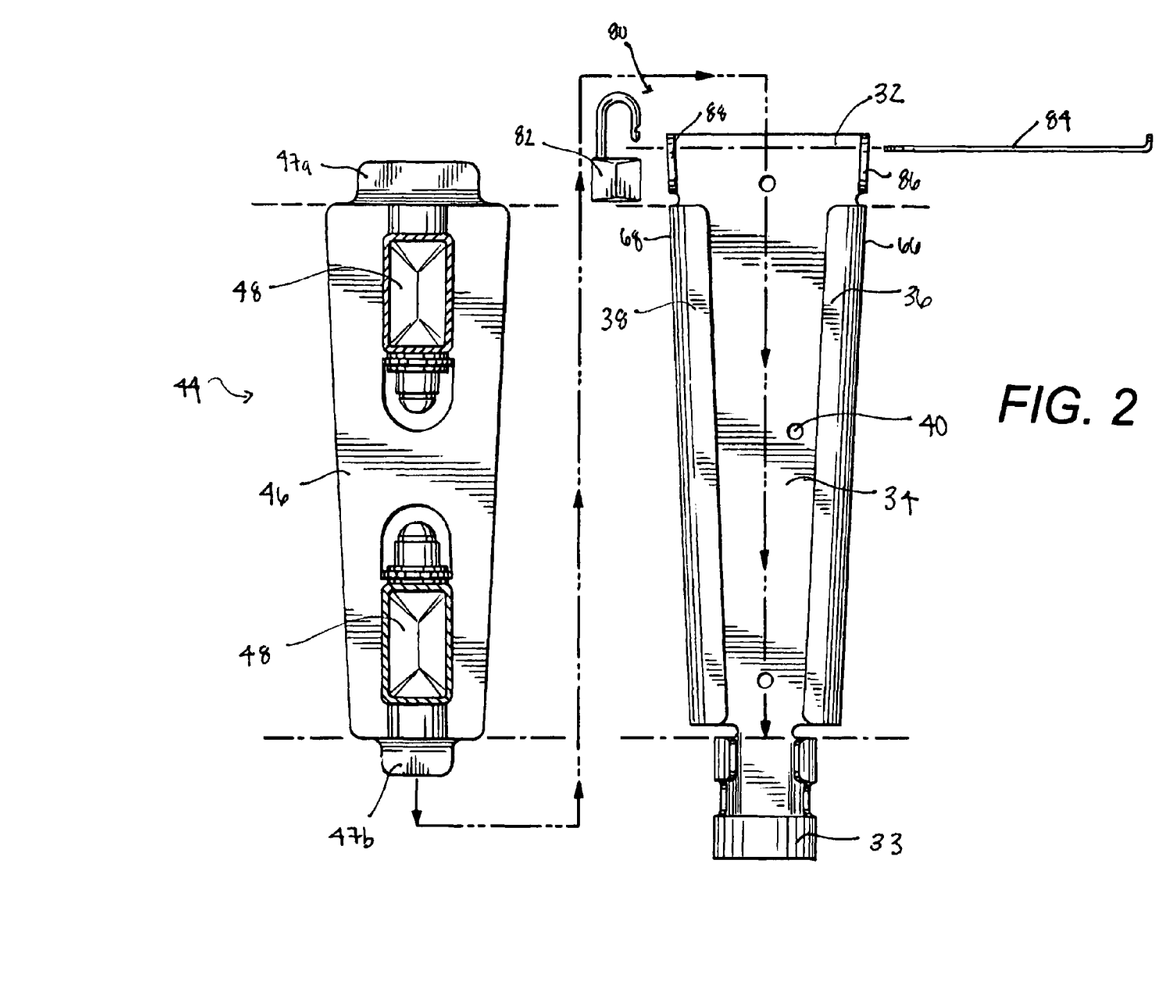
FIG. 2 is a partially exploded view of the corner mount system showing the interface member and the pivotal support arm assembly.

As shown in FIG. 1, the corner mount system 10 also includes a pivotal support arm assembly 44. The support arm assembly 44 includes a tapered connector 46 for connecting the support arm assembly 44 to the interface member 32. The connector 46 is slidably received by the tapered opening 34 of the interface member 32 to couple the support arm assembly 44 to the interface member 32 and the wall bracket 12. The flanges 36, 38 of the interface member 32 secure the connector 46 of the support arm assembly 44 to the interface member 32. The connector 46 includes an upper tab 47a and a lower tab 47b that reside between the flanges 3, 38 when the connector is received by the tapered opening 34. The support arm assembly 44 further includes at least one arm 48 operably joined to the connector 46 to permit movement of the support arm assembly 44 relative to both the connector 46 and the wall bracket 12. The support arm assembly 44 includes a flat screen display bracket 50 for connection to the flat screen display (not shown), wherein the bracket 50 is joined to the arm 48. A locking mechanism 80 is shown in FIGS. 1-2. The locking mechanism 80 includes a lock 82, a bar 84, a first flange 86 and a second flange 88. The components of the locking mechanism 80 interact to prevent undesired or accidental removal of the connector 46 from the tapered opening 34.

In many conventional mounts, an apparatus attached to a flat screen display, and then that apparatus must be mounted to a wall. This requires one operator to hold the flat screen display up while the apparatus is mounted to the wall by a second operator. This can be an difficult job which may not result in a properly mounted flat screen display. The present invention allows the wall bracket 12 and the interface member 32 to be mounted in the corner region A without the added weight of the flat screen display. Once the wall bracket 12 is mounted to wall A1 or A2, and the interface member 32 is coupled to the wall bracket 12, the flat screen display may be mounted to the bracket 50 of the support arm assembly 44. The support arm assembly 44 may then be secured to the interface member 32 by simply sliding connector 46 into the tapered opening 34 of the interface member 32.

Figure 3:
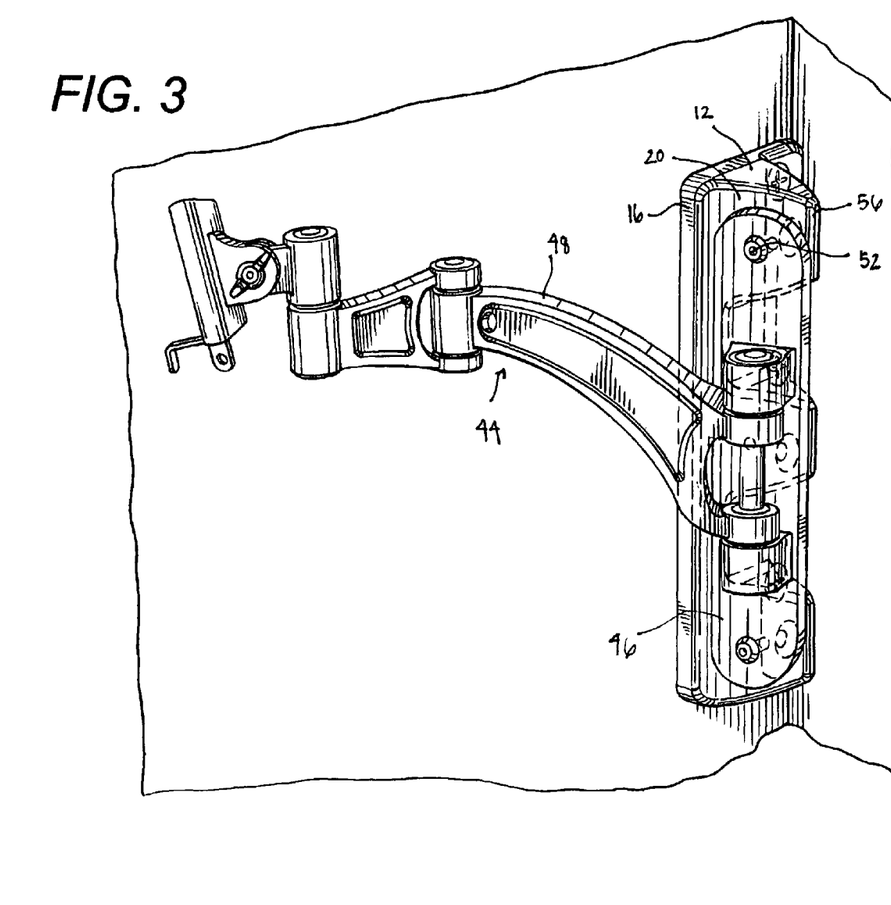
FIG. 3 is a perspective view of a second installation embodiment of a corner mount system having a wall bracket and a pivotal support assembly in a left installation.
Figure 4:
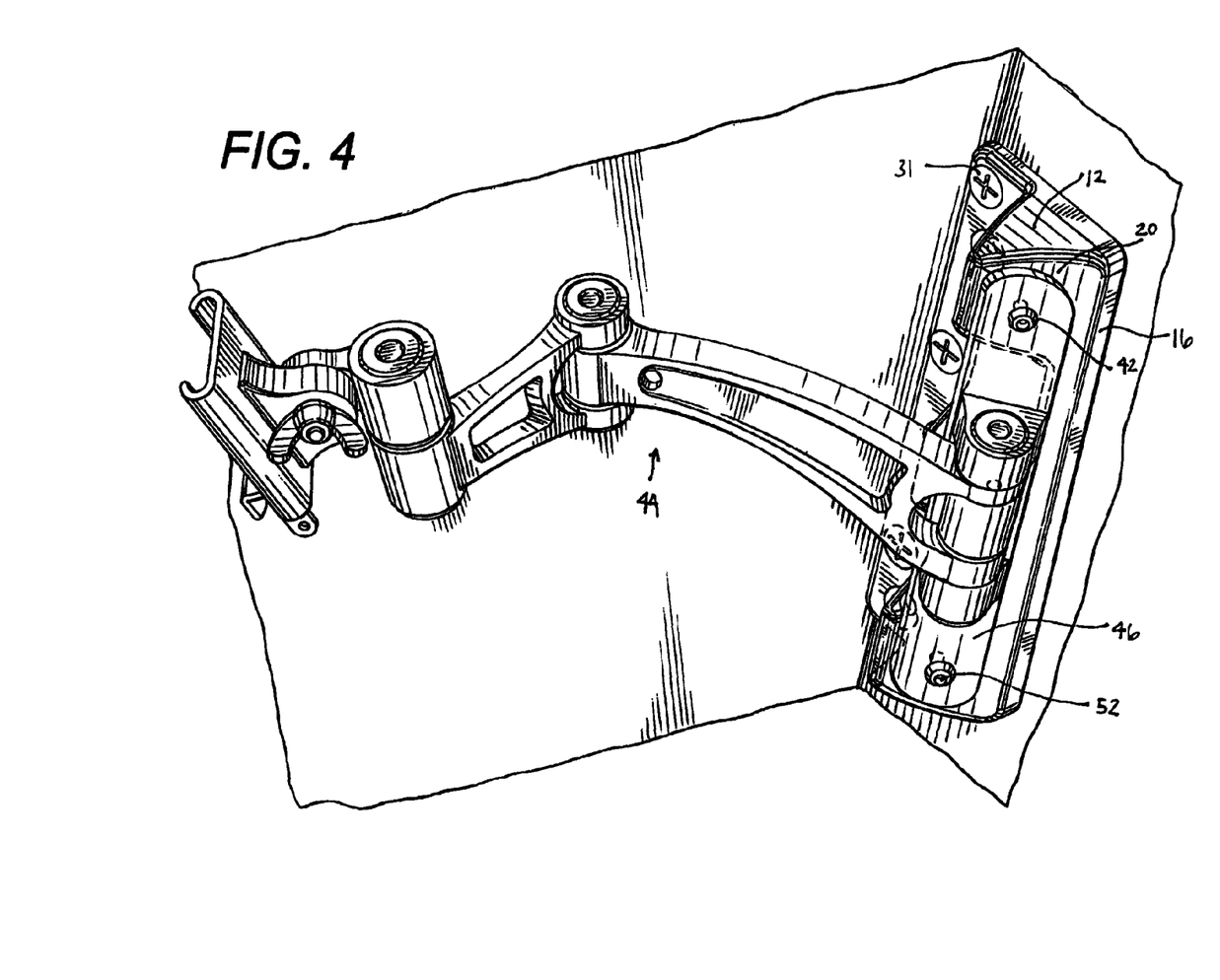
FIG. 4 is a perspective view of the corner mount apparatus of FIG. 3 in a right installation.
Figure 5:
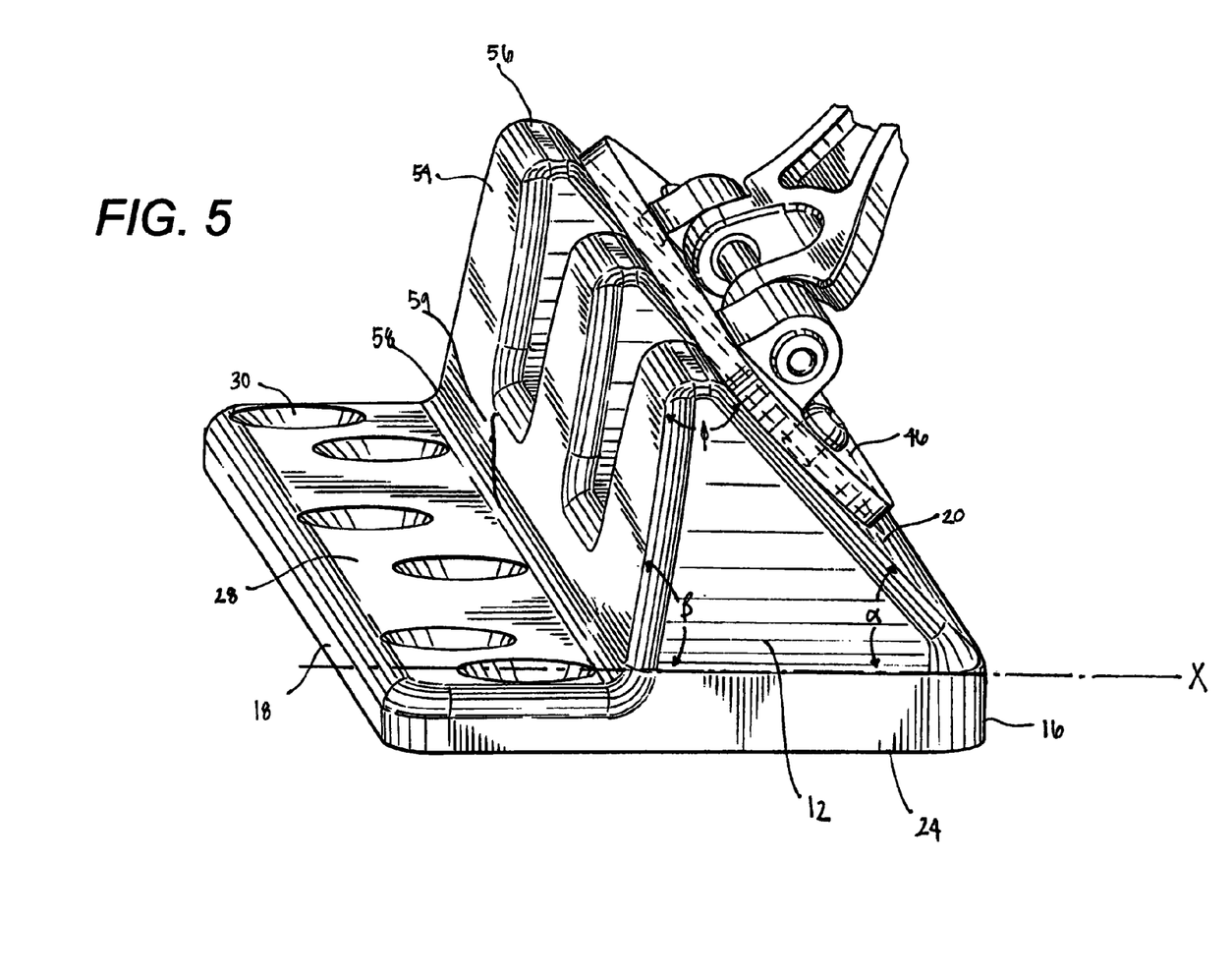
FIG. 5 is a perspective view of the wall bracket.

In a second installation embodiment, shown in FIGS. 3-5, support arm assembly 44 may be directly connected to the wall bracket 12, thereby omitting the interface member 32. This may be accomplished by coupling the connector 46 to the first angled surface 20. The connector 46 may include at least one aperture 52 aligned with the opening 22 on the first angled surface 20 to receive a fastener 42 to couple the support arm assembly 44 to the wall bracket 12.

Figure 7:
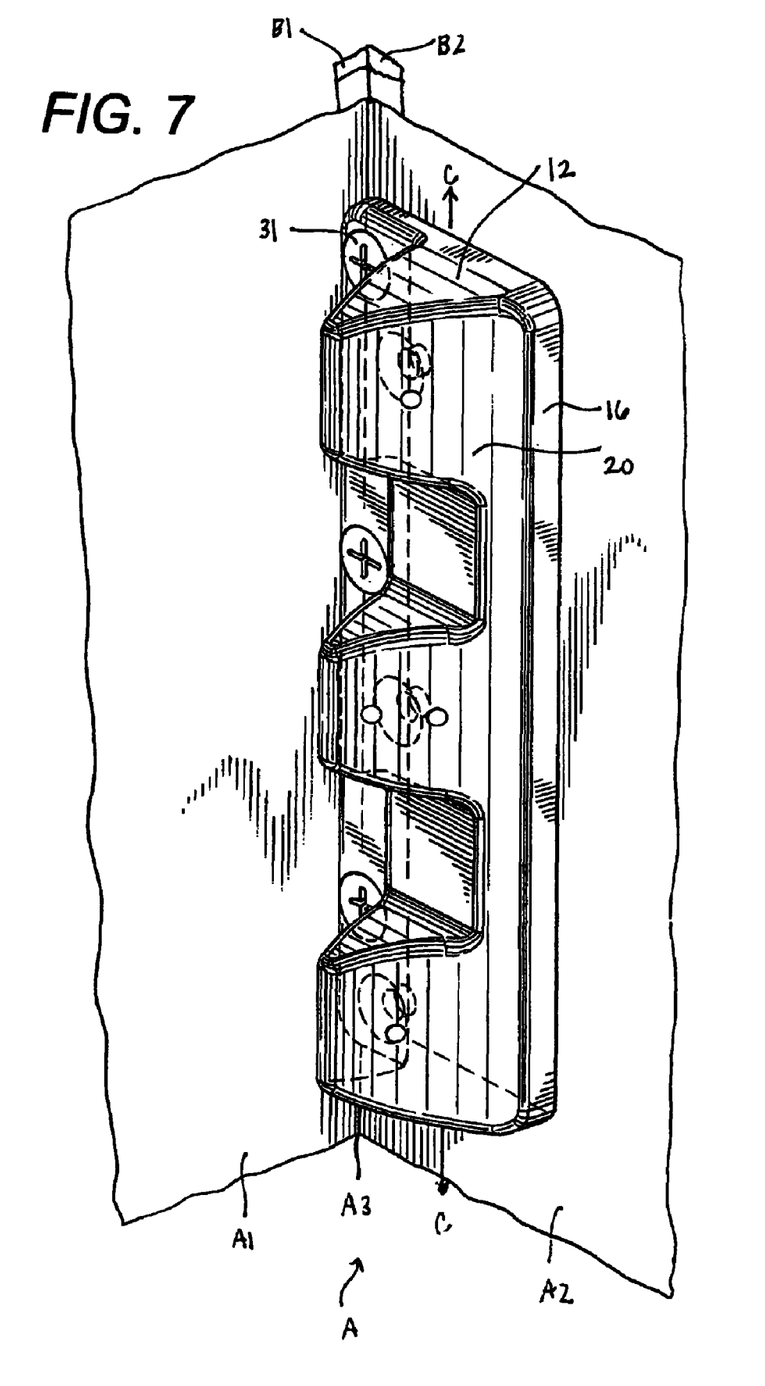
FIG. 7 is a perspective view of the wall bracket of the corner mount system in a right installation.
Figure 8:
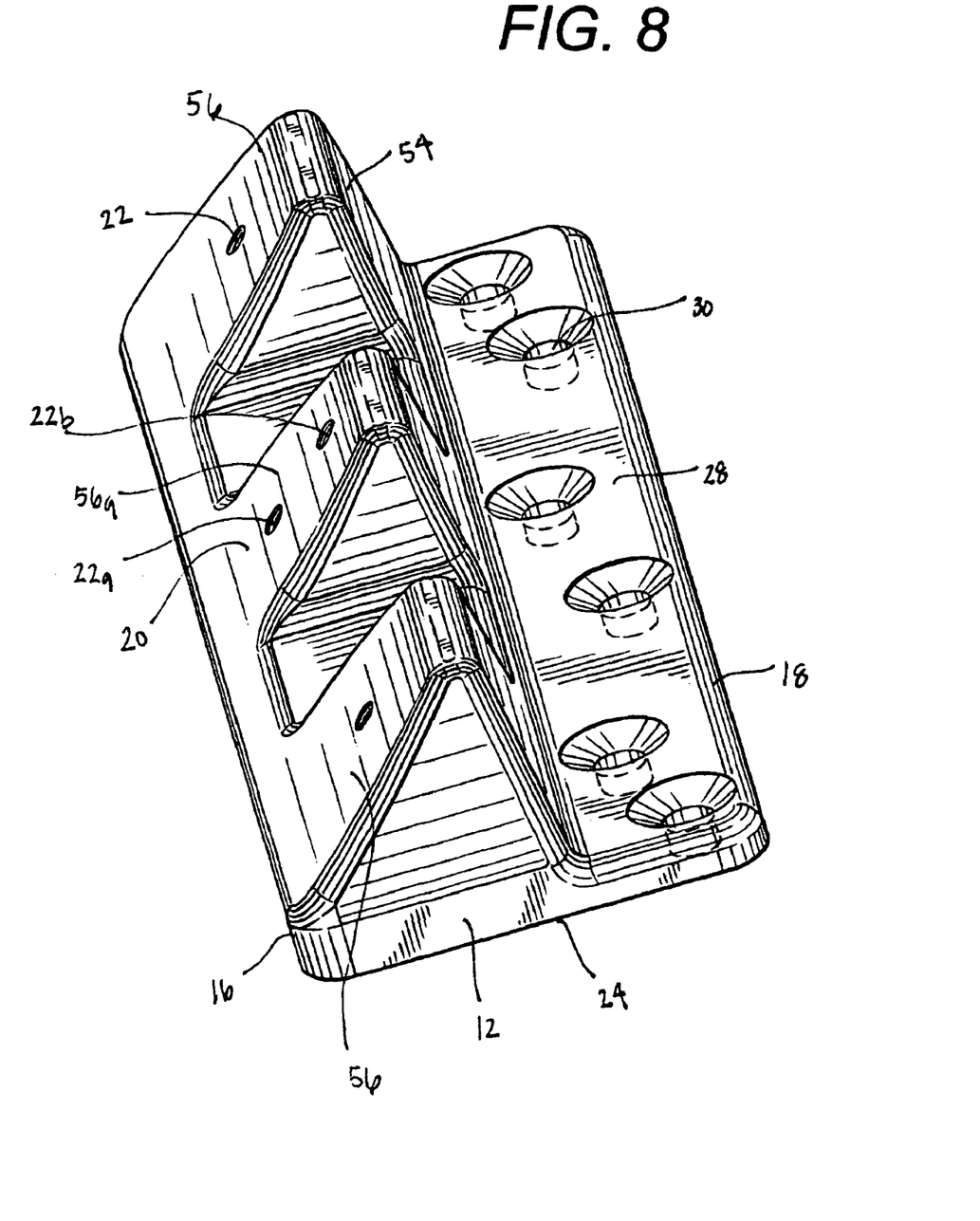
FIG. 8 is a perspective view of the wall bracket of the corner mount system.

As shown in FIGS. 1-9, the wall bracket 12 may include a second angled surface 54. The second angled surface 54 may converge with the first angled surface 20 such that they form a mounting protrusion 56 on the wall bracket 12. The first and second angled surfaces 20, 54 converge at an angle φ. Angle φ is between 30 and 60 degrees, and preferably between 35 and 50 degrees. In one embodiment, the first and second angled surfaces 20, 54 may be discontinuous such that they provide a series of mounting protrusions 56. As shown in FIG. 8, the first and second angled surfaces 20, 54 may essentially form at least one peak region 60 and one void or valley region 62. As shown in FIGS. 5-8, the second angled surface 54 may be substantially perpendicular with respect to the horizontal reference line X, such that the angle β is between 80 and 90 degrees. Preferably, the angle β is between 85 and 90 degrees. This configuration provides the protrusions 56 with a generally triangular cross-section, as seen in FIG. 8. The outermost protrusions 56 have a single opening 22, while the middle protrusion 56a has two openings 22a, 22b, which facilitate connection of the interface member 32 in either the left or right installations.

The second angled surface 54 extends from an intermediate region 58 of the wall bracket 12. In one embodiment, as shown in FIG. 5, the second angled surface 54 is positioned between the first angled surface 20 and securing region 28 of the wall bracket 12. The intermediate region 58 includes a step 59 along an extent of the second angled surface 54 and between the securing region 28 and the valley 62.

Referring to FIGS. 6 and 7, the corner region A includes left wall A1 and right wall A2. Corner seam A3 is located at the intersection of the walls A1 and A2. FIG. 6 shows a left installation, and FIG. 7 shows a right installation. In FIG. 6, the wall bracket 12 is mounted on the left wall A1 such that the second side edge 18 is proximate the corner seam A3. In this left installation configuration, the first angled surface 20 faces away or outward from the right wall A2, whereas the second angled surface 54 faces toward or into the right wall A2. A plurality of fasteners 31 extend through the holes 30 in the wall bracket 12 and into the wall A1 and the stud B1. From there, the interface member 32 is affixed to the first surface 20. In FIG. 7, the wall bracket 12 is mounted on the right wall A2 such that the second side edge 18 is proximate the corner seam A3. To move the wall bracket from the left installation to the right installation, the wall bracket 12 is rotated 180 degrees and translated until it is positioned such that the second side edge 18 is proximate the corner seam A3. Due to the unique design of the wall bracket 12, it may be located adjacent the corner seam A3.

The rotation of the wall bracket 12 is what allows the second side edge 18 to be proximate the corner seam A3 in both the left wall and right wall installations shown in FIGS. 6 and 7. Further, as mentioned above and shown in FIG. 1, the corner region A of a wall generally comprises at least two studs B1 and B2. The studs are located behind the left and right walls A1, A2 respectively. Thus, positioning the corner mount system 10 in the corner region A such that the second side edge 18 is proximate the corner seam A3 ensures that the wall bracket 12 will be secured to a stud. Unlike conventional mounts, the corner mount system 10 does not need to extend across two studs for securement and only consumes a minimal amount of space on the right or left wall A1, A2. In both the right and left installations a longitudinal axis C-C of wall bracket 12 is substantially parallel to corner seam A3, and studs B1, B2, as shown in FIGS. 6-7.

The corner mount system 10 provides a unique method for installation because the operator can selectively chose the left or right wall A1, A2 for deep installation in the corner region A, namely proximate the seam A3, to maximize the usage of corner region A. Once the operator selects a left wall orientation or a right-wall orientation, the wall bracket 12 is affixed to the respective wall A1, A2 to correspond with the left or right installation positions explained above.

While the specific embodiments have been illustrated and described, numerous modifications come to mind without significantly departing from the spirit of the invention, and the scope of protection is only limited by the scope of the accompanying claims.

What is claimed is:

1. A corner mount system for mounting a flat screen display within a corner region, the corner mount system comprising:
   a wall bracket having a first side edge, a second side edge and a first angled surface with at least one opening, wherein the first angled surface extends at an angle from the first side edge, the wall bracket also having a securing region with at least one hole;
   an interface member having a tapered opening defined by opposed flanges, the interface member having an aperture that is aligned with the opening of the first angled surface for reception of a fastener to couple the interface member to the wall bracket; and
   a support arm assembly including a connector, a first arm and a flat screen display bracket, wherein the connector is slidably received by the tapered opening of the interface member to couple the support arm assembly to the interface member and wall bracket.

2. The corner mount system of claim 1, wherein a second angled surface of the wall bracket converges with the first angled surface to form a protrusion.

3. The corner mount system of claim 2, wherein the second angled surface extends at an angle from an intermediate region of the wall bracket such that the second angled surface is positioned between the first angled surface and the securing region.

4. The corner mount system of claim 2, wherein the first angled surface and the second angled surface are discontinuous to provide a series of protrusions.

5. The corner mount system of claim 2, wherein the second angled surface is substantially perpendicular with respect to a horizontal reference line which is substantially parallel to a first end of the wall bracket, and wherein the first angled surface is angled at 50 degrees with respect to the horizontal line which is substantially parallel to the first end of the wall bracket.

6. The corner mount system of claim 1, wherein the corner region includes a right wall, a left wall and a seam located at the intersection of the right and left walls, wherein in a left corner installation, the wall bracket is mounted on the left wall, the second side edge being proximate the corner seam such that the first angled surface faces away from the right wall.

7. The corner mount system of claim 6, wherein in a right corner installation, the wall bracket is mounted on the right wall, the second side edge being proximate the corner seam such that the first angled surface faces away from the left wall.

8. A corner mount system for mounting a flat screen display within a corner region, the corner mount system comprising:
   a wall bracket having a first side edge, a second side edge and a first angled surface that extends outward at an angle from the first side edge, the bracket further having a second angled surface and a securing region with at least one hole for receiving a fastener, the second angled surface extending outward at an angle from an intermediate region adjacent the securing region, wherein the second angled surface resides between the first angled surface and the securing region;
   a pivotal support arm assembly having a connector for securing the support arm assembly to the first angled surface of the wall bracket, the support arm assembly further including a first arm and a flat screen display bracket for attaching the flat screen display to the support arm assembly.

9. The corner mount system of claim 8, wherein the second angled surface extends at an angle from an intermediate region of the wall bracket such that the second angled surface is positioned between the first angled surface and the securing region.

10. The corner mount system of claim 8, wherein the first angled surface and the second angled surface converge to form a protrusion.

11. The corner mount system of claim 8, wherein the first angled surface and the second angled surface are discontinuous to provide a series of protrusions.

12. The corner mount system of claim 8 further including an interface member having a tapered opening defined by opposed flanges, the connector of the support arm assembly being slidably received by the tapered opening, the interface member also having an aperture that is aligned with an opening of the first angled surface of the wall bracket for reception of a fastener to couple the interface member to the wall bracket.

13. The corner mount system of claim 8, wherein the corner region includes a right wall, a left wall and a seam located at the intersection of the right and left walls, wherein in a left corner installation, the wall bracket is mounted on the left wall, the second side edge being proximate the corner seam such that the second angled surface faces toward the right wall, and the first angled surface faces away from the right wall.

14. The corner mount system of claim 8, wherein in a right corner installation, the wall bracket is mounted on the right wall, the second side edge being proximate the corner seam such that the second angled surface faces toward the left wall, and the first angled surface faces away from the left wall.

15. A corner mount system for mounting a flat screen display within a corner region, the corner mount system comprising:
   a wall bracket having a first side edge, a second side edge, a first angled surface that extends at an angle from the first side edge, and a second angled surface, wherein the first angled surface and the second angled surface converge to define a protrusion, the wall bracket further including a securing region adjacent the second side edge, the securing region including at least one hole for receiving a fastener.

16. The corner mount system of claim 15, wherein the second angled surface extends at an angle from an intermediate region of the wall bracket such that the second angled surface is positioned between the first angled surface and the securing region.

17. The corner mount system of claim 15, wherein the first angled surface and the second angled surface are discontinuous to provide a series of protrusions.

18. The corner mount system of claim 15, wherein the corner region includes a right wall, a left wall and a seam located at the intersection of the right and left walls, wherein in a left corner installation, the wall bracket is mounted on the left wall, the second side edge being proximate the corner seam such that the second angled surface faces toward the right wall, and the first angled surface faces away from the right wall.

19. The corner mount system of claim 18, wherein in a right corner installation, the wall bracket is mounted on the right wall, the second side edge being proximate the corner seam such that the second angled surface faces toward the left wall, and the first angled surface faces away from the left wall.

20. The corner mount system of claim 15 further including an interface member having an aperture that is aligned with an opening of the first angled surface for reception of a fastener to couple the interface member to the wall bracket.

* * * * *